Patented Oct. 22, 1940

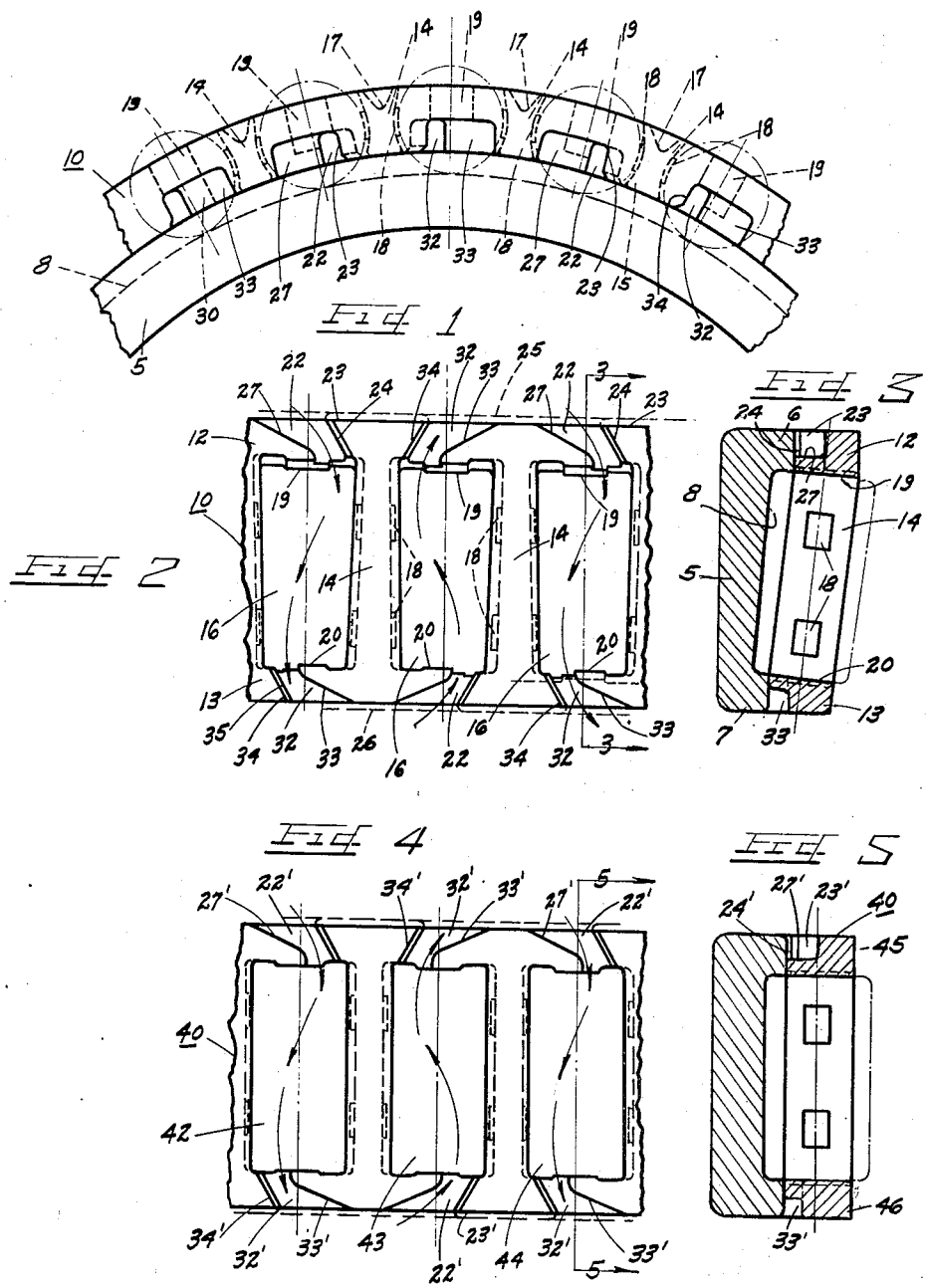

2,219,031

UNITED STATES PATENT OFFICE 2,219,031

BEARING CONSTRUCTION

Harold Frauenthal, South Bend, Ind., and Stanley R. Thomas, Lyons, Mich., assignors to Bantam Bearings Corporation, South Bend, Ind., a corporation of Indiana Application December 1, 1937, Serial No. 177,404

10 Claims. (Cl. 308—217)

This invention relates to bearings, and more particularly is directed to a bearing assembly construction suitable for use in connection with various types of bearings such as tapered roller bearings, cylindrical roller bearings and ball bearings.

It has been a problem of considerable moment in the design of bearing assemblies to provide for proper lubrication of the bearing races and bearing members. Many types of bearing structures have been devised to accomplish this result but no marked success has been attained by any of the constructions with which we are familiar.

In the majority of such prior constructions reliance was placed upon the pumping action produced by rotation of the bearing member, such as a ball, past an orifice into which the lubricant might flow. This however does not produce any positive introduction of lubricant into the bearing assembly, and uniform lubrication is not attained.

The present invention contemplates a structure which will positively feed the lubricant into the bearing races and over the bearing surfaces independently of the direction of rotation of the bearing members themselves. With such a construction, adequate and uniform lubrication of all surfaces is assured.

In its preferred embodiment the present invention provides a bearing retainer which is so constructed as to act as an impeller or pump for forcing the lubricant to the desired locations. The construction is such that the lubricant is forced into one side of the retainer and drawn out of the opposite side at any one or more of the bearing pockets, and if desired the retainer can be so formed that the lubricant travels a sinuous path back and forth in successive openings or in any desired sequence of openings, depending upon the amount of lubrication required and the speed of rotation of the assembly.

One of the main advantages of the present construction is its non-directional feature, whereby the positive feeding of lubricant through the bearings and races is assured independently of the direction of rotation of the retainer. Also, the construction provides a recirculating effect so that the lubricant alternately flows in opposite directions through the bearing pockets, the cage or retainer acting as a pump.

Another feature of the present invention resides in the lightening of the casting comprising the retainer by the elimination of some metal therefrom due to the impeller construction of the cage. This effects a saving in weight as well as an appreciable saving in material and cost. In forming our pumping type of retainer, we are able to form the retainer as a casting, and by novel arrangement of the impeller structure, we are able to produce the sharp angled edges required for the pumping action by the ordinary machining operations necessary in finishing any retainer. Thus no additional labor costs are involved in producing our structure.

The present invention is equally applicable to tapered roller bearings, straight roller bearing and ball bearing assemblies, and the embodiment thereof described specifically is to be understood as being only one form which our invention may take.

An additional advantage secured by our construction is the lubrication of the cage track on the lips of the bearing race. As is well known, the cage rotates about the bearing race at a rate substantially less than the rate of relative rotation of the races, but has sliding engagement along the laterally spaced lips of the race. By reason of the present construction we provide adequate lubrication of these surfaces, as well as lubrication of the bearing races and bearing members.

Another advantage secured by the present invention is the cross flow of lubricant in a diagonal direction across the bearing pockets. This insures spreading of the lubricant over all the bearing surfaces and adequate lubrication throughout the entire assembly. In this connection, the reversal of the flow back and forth across the respective pockets effected by the present construction is in opposite diagonal directions to secure further uniformity of lubrication.

In carrying out our present invention we provide a retainer which has, at one or more bearing pockets, an intake action at one side of the pocket produced by an impeller-like lip disposed posterior to a relief in the side wall of the retainer. At the opposite lateral edge of the retainer, and diagonally across the pocket, is a reverse construction producing an aspirator action for exhausting the lubricant at the opposite side of the bearing pocket. The design of the lateral edges of the retainer is somewhat symmetrical, whereby rotation of the cage in either direction produces the same lubricating action.

Still another feature of the present invention is the provision of means for controlling the quantity of lubricant admitted to the interior of the bearing pockets by the impeller action of the retainer cage. In addition, this means also serves to form bearing pads for the endwise or axial movement of bearing assemblies of the roller type. Thus we provide a retainer member having bearing pads on all the defining walls of the bearing pockets for supporting the roller members against both axial and circumferential movement. However, the end pads are so disposed with respect to the impeller ports and exhaust ports of the retainer as to both control and direct the flow of lubricant within the bearing pockets. Thus adequate and controlled lubrication of the desired surfaces in the bearing assembly is secured.

The present construction, by providing the plowing effect of the lips cast integrally on opposite sides of the retainer, tends to prevent the lubricant from building up high on one side of the assembly and low on the other side, as is sometimes prevalent in bearings of the tapered roller type, where the construction has had the effect of forcing all the lubricant to one side of the bearing.

Other objects and advantages of the present invention will be more apparent from the following detailed description which, taken in conjunction with the accompanying drawing, will disclose to those skilled in the art the particular construction and operation of a preferred form of the present invention.

In the drawing:

Figure 1 is a side elevational view of a bearing assembly showing the present invention;

Figure 2 is an internal plan view of the retaining cage of Figure 1;

Figure 3 is a sectional view taken substantially on line 3—3 of Figure 2;

Figure 4 is a view corresponding to Figure 2 of a slightly modified construction; and Figure 5 is a sectional view taken on line 5—5 of Figure 4.

Referring now in detail to the drawing, in Figures 1 to 3 we have disclosed a bearing construction embodying the present invention as applied to a tapered roller bearing assembly.

In this embodiment of the invention the bearing assembly includes an inner bearing race 5 which has the laterally spaced radially extending lip portions 6 and 7 between which is formed the race surface 8 upon which the roller members, shown in dotted lines in Figures 1 and 3, are adapted to ride. The roller members are adapted to be carried in a retainer or cage member indicated generally at 10, comprising two side ring portions 12 and 13 interconnected by spaced web portions shown in dotted lines at 14 in Figure 1. The web portions 14 have circumferentially flaring inner surfaces 15 which tend to close the bottom portion of the bearing pockets 16 in which the anti-friction roller members are received. This retains the anti-friction members from falling inwardly through the pockets when the retainer is removed from the bearing race.

The radial outer portions of the webs 14 are provided with axially recessed portions, indicated at 17, which form two extending ears adapted to be spread by means of a suitable tool for retaining the anti-friction members against outward radial displacement from the retainer, thus holding these members for free movement within the bearing pockets 16 but not allowing displacement of the members from these pockets. The wall portions of the web members 14, which face into the pockets 16, are each provided with spaced bearing pads 18 having arcuately curved surfaces of a radius corresponding to the radius of the anti-friction rollers. These pads center the roller members within the pockets 16 and support the same for rotative movement therein.

Disposed on the inner races of the side rings 12 and 13 which define the axial end walls of the pockets 16 are bearing pads 19 and 20, respectively, which support the anti-friction members against endwise movement within the pockets so that each of the defining walls of the pocket is provided with one or more bearing pads for supporting the rollers for rotative movement therein.

In order to provide for positive feeding of lubricant into the bearing recesses and onto the surfaces of the anti-friction members, we provide the cage 10 with ports which are shown more in detail in Figures 2 and 3. Considering Figure 2 in detail, which is an internal plan view of a portion of the retainer shown in Figure 1, it will be noted that the side wall 12 of the retainer is provided with an opening 22 extending diagonally therethrough and defined by the relatively sharp cutting edge surface 23 which has chamfered seating engagement on the lip 6 of the bearing race, as indicated at 24. In forming such a sharp edge, the retainer, which is a cast bronze or brass member, is initially formed to the lateral dimensions indicated by the dotted lines 25 and 26. The side faces of the side ring portions 12 and 13 are then machined down in the usual manner which results in removal of the fillet corners and produces the sharp cutting edge indicated at 23. It will be noted that the wall 27 which defines the outer surface of the opening 22 is inclined inwardly at an appreciable angle from the outer surface of the side ring 12 to the inner wall of the pocket 16 which has the bearing pad 19 thereon. This provides for free flow of lubricant into the opening to be scooped or impelled inwardly by the inclined surface 23 when the retainer is rotating in a counter-clockwise direction as viewed in Figure 1.

The opening 22 is cut through for only about one third to one half of the total radial thickness of the ring portion 12, and it will be noted that the bearing pad 19, as clearly shown in Figure 1, terminates substantially intermediate the radial ends of the opening 22. This provides for passage of oil between the inner end of the bearing pad 19 and the lip 6 along the lateral inner face of the side ring portion 12 of the retainer. This oil therefore finds its way to the bearing pad 19 and also through the interior of the race member 5 onto the surface 8, and consequently onto the surface of the anti-friction rollers moving into contact therewith. The bearing pads 19 may be lengthened or shortened radially, as desired, in order to control the amount of lubricant that passes along the lateral inner surface of the side ring portion 12.

Thus, as shown at the left hand end of Figure 1, the bearing pad 19 may be extended downwardly to the radial inner edge of the side ring portion 12 as indicated at 30, or it may be formed as indicated at the next adjacent bearing pocket, which is also indicated at 19, or it may terminate at the upper edge of the opening 22 as indicated at 19′ in Figure 1. While various lengths of pads are shown in Figure 1, it is to be understood that the pads will preferably all be of the same size in any one retainer. This length of the bearing pad 19 is designed in accordance with the contemplated speed of rotation of the retainer and the amount of lubrication which it is necessary to provide. For example, a pad such as constructed at 19' will allow more lubricant to be scooped into the bearing pocket by the impeller action at the opening 22 than a bearing pad such as indicated in the intermediate pocket at 19 in Figure 1, or one which extends entirely along the radial extent of the inner surface of the wall as indicated at 30.

In order to provide for free flow of the lubricant through the bearing pocket and into engagement with all of the bearing contact surfaces therein, an aspirator port or exhaust port is provided on the opposite side ring portion 13 as indicated at 32. This aspirator port functions by reason of the relative axially inward inclination of the surface 33 corresponding to the surface 27 and the aspirator effect produced by the sharp flush edge 34 corresponding to the edge 23, which edge 34 is also chamfered as at 35. It will be noted that the opening 32 is a duplicate of the opening 22 but extends in the opposite direction and lies upon the opposite side of the center line of the bearing pocket 16.

When the retainer is rotating in a counter-clockwise direction, the opening 22 acts as an inlet opening through which lubricant is forced by the impelling action of the scoop shaped surface defined by the sharp edge 23. When the retainer is rotating in a clockwise direction the opening 32 acts as an inlet opening through which the lubricant is forced by the scoop action of the edge 34, together with the relief of the surface 33. Thus, the openings 22 and 32 act as exhaust and inlet openings, respectively, when the retainer is rotating in a clockwise direction, and as inlet and exhaust openings, respectively, when the retainer is rotating in a counter-clockwise direction.

Each of the bearing pockets 16 is provided with a pair of these oppositely disposed openings lying on opposite sides of the center lines thereof in the illustrated form of the invention. However, it is within the scope of the present invention to provide such openings at any one or more of the bearing pockets or at equally spaced intervals about the circumferential extent of the retainer, depending upon the amount of lubrication required, as determined by the bearing surfaces, the speed of rotation, and load imposed on the assembly. Therefore, while the invention is illustrated as having such openings at each bearing pocket, it is to be understood that only one bearing pocket need be provided with such openings, or only certain of the bearing pockets need be so constructed within the scope of the present invention.

Assuming a counter-clockwise rotation of the retainer 10 in the embodiment of the invention shown in Figure 1, all of the inlet openings are indicated by the same reference numerals, while all of the outlet openings are indicated by corresponding reference numerals. It will thus be seen that the lubricant flows through the inlet opening and must travel diagonally forwardly of the bearing pocket 16 to the associated outlet opening.

At the next bearing pocket the lubricant is forced inwardly from the opposite side of the retainer, and travels diagonally forwardly across the bearing pocket to the associated outlet opening which is disposed on the same side of the retainer as the first inlet opening. It will therefore be apparent that the lubricant travels a tortuous path from side to side of the retainer, and at the same time moves diagonally forwardly in opposite directions in the spaced bearing pockets. The travel of the lubricant is indicated by the arrows in Figure 2. Of course, it is to be understood that the ports may be omitted at any of the bearing pockets, and the lubricant may travel from one side of the retainer through one pocket and at any circumferential pocket may then travel in the opposite direction back to the first side of the retainer.

By forming the retainer as a casting, the pattern may be so made that the openings 22 and 32 are preformed in the casting, which materially reduces the weight thereof and effects an appreciable saving in the cost. At the same time, since the outer radial surfaces of the side ring 12 and 13 must be machined, rounded corners can be formed on the impeller surfaces in the casting which, when the machining operation has been completed, will provide the sharp corners desired for the impelling action. In addition, by controlling the radial extent of the bearing pads 19 and 20, the control of the flow of lubricant at each of the pockets may be secured and its direction may be predetermined. By providing the chamfered surfaces 24 and 35, a certain portion of the lubricant entering the openings 22 or, when the direction of rotation is reversed, the openings 32 will be forced onto the outer annular surface of the lips 6 and 7, thereby providing for lubrication of these surfaces upon which the retainer has sliding movement as it rotates due to the rotation of the roller members. With such a construction therefor, adequate and uniformly controlled lubrication of all the required bearing surfaces is assured.

It will thus be seen that the impeller of the present invention is non-directional in operation; that is to say, it operates in either direction of rotation and provides a recirculating flow of lubricant back and forth through the bearing pockets. The pockets may all be provided with openings for forcing lubricant thereinto and exhausting lubricant therefrom, or only certain ones of the pockets may be so constructed, depending upon the amount of lubrication desired.

In Figures 4 and 5 we have disclosed a modified form of the invention for use with a straight roller bearing assembly. The retainer 40 in this embodiment of the invention is provided with the bearing pockets 42, 43, 44, and so on, about the circumferential extent of the retainer. Each wall of the bearing pockets 42, 43 and 44, is provided with bearing pads corresponding to the pads 18, 19 and 20 of Figures 1 and 2, which pads may extend for the full radial thickness of the retainer or for only a portion of the height thereof, depending upon the control of lubrication desired. The inlet openings 22', when the cage is rotated in a counter-clockwise direction, are formed in the same manner as the openings 22 of Figure 2, and the corresponding outlet openings 32' are also formed similarly to the outlet openings 32 of Figure 2. Each of these openings is defined by a relief portion and an impelling surface functioning only when the retainer is moving in the proper direction. The lubricant passes in the same manner back and forth through the bearing pockets moving from the opening 22' of the bearing pocket 42 diagonally forwardly across the pocket to the outlet opening 32', hence inwardly through the opening 22' of the pocket 43 and diagonally thereacross to the outlet opening 32', and once more reversing its direction through the pocket 44. The flow of the lubricant is indicated in arrows in Figure 4, and it will be noticed that the lubricant circulates laterally back and forth between the side portions 45 and 46 of the retainer to produce the desired lubrication of all of the bearing surfaces. The various surfaces defining the openings 22' and 32' are indicated by primed reference numerals corresponding to the relative parts thereof shown in the embodiment of the invention disclosed in Figure 2.

It is therefore apparent that we have provided a bearing retainer or cage construction which acts as an impeller for positively forcing the lubricant through the bearing assembly and across the bearing pockets. The aspirating effect produced by the relief of the wall 33 and the vacuum created by the portion 34 of the opening 32 tends to create a negative pressure in the opening 32 which draws the oil or lubricant outwardly therefrom.

We are aware, of course, that details of the construction of certain of the parts herein shown and described may be made without in any way departing from the underlying principles of the present invention, and we therefore do not intend to limit our invention, except as defined by the scope and spirit of the appended claims.

We claim:

1. A retainer for an anti-friction bearing assembly, comprising a cage having a plurality of circumferentially spaced pockets for receiving anti-friction members therein, and means in one lateral wall of said cage for forcing lubricant into alternate pockets and exhausting lubricant from the intermediate pockets.

2. A retainer for an anti-friction bearing assembly, comprising a cage having a plurality of circumferentially arranged pockets for receiving anti-friction members therein, and means in opposite lateral walls of said cage at the pockets thereof for forcing lubricant into alternate pockets from one side of said cage and into the intermediate pockets from the opposite side of said cage, said means comprising alternate inlet and outlet ports for each pocket with the port openings into the opposite ends of each pocket being spaced on opposite sides of a medial radial plane through the pocket and with the exhaust port opening spaced circumferentially forwardly of the inlet port opening in each pocket.

3. A retainer for a roller bearing assembly having side ring portions spaced apart by transverse webs defining substantially rectangularly shaped bearing pockets, each of said side rings having openings in the radially inner edges thereof extending angularly into the ends of said pockets, alternate openings in each ring extending in opposite angular directions to provide alternate intake and exhaust lubricant passages for circumferentially successive pockets, said openings being circumferentially staggered on opposite sides of the retainer whereby each pocket has both an intake and exhaust opening at opposite ends thereof independently of the direction of rotation of the retainer.

4. The retainer of claim 3 in which each of said openings flares outwardly toward the outboard side of the respective side ring.

5. The retainer of claim 3 wherein each of said openings has defining side walls diverging outwardly from the ends of said pocket, and in which the side wall acting as the scooping side of an intake passage has a beveled radially inner edge acting to force lubricant onto the annular surfaces on which said side rings are guided.

6. The retainer of claim 3 characterized in that said openings are so angled at opposite sides of each pocket that the pocket end of the intake opening is disposed circumferentially rearwardly of the pocket end of the outlet opening, whereby lubricant is moved through said pocket in a circumferential direction as well as axially thereacross.

7. A retainer for a roller bearing assembly comprising spaced side rings having transverse webs therebetween defining substantially rectangularly shaped bearing pockets, each of said rings having lubricant openings extending from the outboard side thereof into the end walls of said pockets, the successive openings in each ring being alternately angled in opposite directions to form alternate intake and exhaust passages, with the openings in the opposite ends of each pocket being angled in opposite directions, and pads on the side and end walls of said pockets, the end wall pads being relieved at the radially innermost portions thereof adjacent the openings into said pockets to pass a portion of the lubricant along said end walls.

8. A retainer of the class described having a plurality of circumferentially arranged pockets, means in one lateral defining wall of one pocket for forcing lubricant into said pocket upon rotation of said retainer, and means in the opposite lateral defining wall of said pocket for exhausting lubricant from said pocket, and means comprising passageways extending diagonally through said walls with the inner ends thereof opening on opposite sides of the longitudinal median plane through said pocket.

9. The retainer of claim 8 further characterized in that the inner end of said exhaust passageway is spaced circumferentially forwardly relative to the inner end of the inlet passageway.

10. A retainer of the class described having a series of circumferentially arranged pockets defined by transverse webs extending between annular side walls, means in each of said side walls forming inlet passageways into the end walls of alternate pockets and exhaust passageways into the end walls of the intermediate pockets, the inner ends of the passageways into the opposite ends walls of each pocket being offset circumferentially in such manner that lubricant is passed diagonally through said pocket in a circumferentially forward direction.

HAROLD FRAUENTHAL.
STANLEY R. THOMAS.